(12) United States Patent
Lee et al.

(10) Patent No.: US 9,070,513 B2
(45) Date of Patent: Jun. 30, 2015

(54) METHOD OF MANUFACTURING CHIP-TYPE ELECTRIC DOUBLE LAYER CAPACITOR

(75) Inventors: Sang Kyun Lee, Gyunggi-do (KR); Chang Ryul Jung, Seoul (KR); Sung Ho Lee, Gyunggi-do (KR); Dong Sup Park, Gyunggi-do (KR); Yeong Su Cho, Gyunggi-do (KR); Hyun Chul Jung, Gyunggi-do (KR)

(73) Assignee: SAMSUNG ELECTRO-MECHANICS CO., LTD., Suwon (KR)

( * ) Notice: Subject to any disclaimer, the term of this patent is extended or adjusted under 35 U.S.C. 154(b) by 303 days.

(21) Appl. No.: 13/568,483

(22) Filed: Aug. 7, 2012

(65) Prior Publication Data

US 2012/0297594 A1 Nov. 29, 2012

Related U.S. Application Data

(62) Division of application No. 12/654,751, filed on Dec. 30, 2009, now abandoned.

(30) Foreign Application Priority Data

| Jul. 6, 2009 | (KR) | ......................... 10-2009-0061333 |
| Sep. 11, 2009 | (KR) | ......................... 10-2009-0086085 |
| Sep. 14, 2009 | (KR) | ......................... 10-2009-0086487 |
| Sep. 14, 2009 | (KR) | ......................... 10-2009-0086624 |

(51) Int. Cl.
  *H01G 9/00* (2006.01)
  *H01G 9/008* (2006.01)
  (Continued)

(52) U.S. Cl.
  CPC ............... *H01G 9/155* (2013.01); *Y10T 29/417* (2015.01); *H01G 9/016* (2013.01); *H01G 9/10*
  (Continued)

(58) Field of Classification Search
  None
  See application file for complete search history.

(56) References Cited

U.S. PATENT DOCUMENTS

| 5,041,696 A | 8/1991 | Utner |
| 6,459,564 B1 | 10/2002 | Watanabe et al. |

(Continued)

FOREIGN PATENT DOCUMENTS

| CN | 1698148 | 11/2005 |
| CN | 1767104 | 5/2006 |

(Continued)

OTHER PUBLICATIONS

Office Action issued by the U.S. Patent and Trademark Office on Aug. 22, 2013 in the related U.S. Appl. No. 12/654,751.

(Continued)

*Primary Examiner* — Seahvosh Nikmanesh
(74) *Attorney, Agent, or Firm* — Staas & Halsey LLP

(57) ABSTRACT

A method of manufacturing a chip-type electric double layer capacitor, including: forming a lower case having an opened housing space and first and second external terminals buried therein, the first and second external terminals having first surfaces exposed to the housing space, respectively, and second surfaces exposed to an outer region of the lower case, respectively; mounting an electric double layer capacitor cell in the housing space such that the electric double layer capacitor cell is electrically connected to the first surfaces of the first and second external terminals exposed to the housing space; and mounting an upper cap on the lower case so as to cover the housing space.

7 Claims, 8 Drawing Sheets

(51) Int. Cl.
*H01G 9/10* (2006.01)
*H01G 11/74* (2013.01)
*H01G 11/80* (2013.01)
*H01G 11/82* (2013.01)
*H01G 11/84* (2013.01)

(52) U.S. Cl.
CPC ........ (2013.01); *H01G 11/74* (2013.01); *H01G 11/80* (2013.01); *H01G 11/82* (2013.01); *H01G 11/84* (2013.01); *Y02E 60/13* (2013.01); *Y02T 10/7022* (2013.01)

(56) References Cited

U.S. PATENT DOCUMENTS

| | | | |
|---|---|---|---|
| 7,095,605 B2 | 8/2006 | Suenaga et al. | |
| 7,248,460 B2 | 7/2007 | Omura et al. | |
| 2001/0012193 A1 | 8/2001 | Watanabe et al. | |
| 2004/0241542 A1 | 12/2004 | Nakamura et al. | |
| 2005/0207095 A1 | 9/2005 | Omura et al. | |
| 2005/0250010 A1 | 11/2005 | Kurihara et al. | |
| 2006/0087795 A1 | 4/2006 | Nagasawa et al. | |
| 2007/0014076 A1 | 1/2007 | Omura et al. | |
| 2008/0206635 A1 | 8/2008 | Watanabe et al. | |
| 2009/0011330 A1 | 1/2009 | Onoderal et al. | |

FOREIGN PATENT DOCUMENTS

| | | |
|---|---|---|
| DE | 103 12 999 A1 | 10/2004 |
| JP | 1-315122 | 12/1989 |
| JP | 11-054387 | 2/1999 |
| JP | 2001-216952 | 8/2001 |
| JP | 2004-186089 | 7/2004 |
| JP | 2004-327887 | 11/2004 |
| JP | 2005-166975 | 6/2005 |
| JP | 2006-12792 | 1/2006 |
| JP | 2006-49289 | 2/2006 |
| JP | 2006-128080 | 5/2006 |
| JP | 2007-26945 | 2/2007 |
| JP | 2007-207920 | 8/2007 |
| JP | 2008-85084 | 4/2008 |
| JP | 2008-211094 | 9/2008 |
| JP | 3151177 | 5/2009 |
| JP | 2009-200161 | 9/2009 |
| KR | 1992-0018787 | 10/1992 |
| KR | 10-0881854 | 2/2000 |
| KR | 10-0774735 | 11/2007 |
| KR | 10-2007-0116825 | 12/2007 |

OTHER PUBLICATIONS

U.S. Patent Office Action mailed Aug. 29, 2012 in corresponding U.S. Appl. No. 12/654,751.
Office Action mailed from the U.S. Patent and Trademark Office on Mar. 14, 2013 in the related U.S. Appl. No. 12/654,751.
Korean Office Action issued on Dec. 20, 2010 issued in corresponding Korean Patent Application No. 10-2009-0086085.
Korean Office Action issued on Dec. 20, 2010 in corresponding Korean Patent Application No. 10-2009-0086624.
Japanese Notice of Information Provision issued Aug. 16, 2011 in corresponding Japanese Patent Application No. 2011-14864.
Japanese Office Action mailed Nov. 8, 2011 issued in corresponding Japanese Patent Application No. 2010-002220.
Chinese Office Action mailed Mar. 5, 2012 issued in corresponding Chinese Patent Application No. 201010003399.0.
U.S. Patent Restriction Requirement mailed Jun. 18, 2012 in corresponding U.S. Appl. No. 12/654,751.
U.S. Appl. No. 12/654,751, filed Dec. 30, 2009, Sang Kyun Lee et al., Samsung Electro-Mechanics Co., Ltd.
Office Action issued by the German Patent Office on Sep. 10, 2013 in the related German patent application No. 10 2010 001 062.6.
Office Action issued by the State Intellectual Property Office of China on Oct. 9, 2012 in the corresponding Chinese patent application No. 201010003399.0.
Office Action issued by the Chinese State Intellectual Property Office on May 8, 2013 in the corresponding Chinese Application No. 201010003399.0.

METHOD OF MANUFACTURING CHIP-TYPE ELECTRIC DOUBLE LAYER CAPACITOR

CROSS-REFERENCE TO RELATED APPLICATIONS

This application is a U.S. divisional application filed under 37 CFR 1.53(b) claiming priority benefit of U.S. Ser. No. 12/654,751 filed in the United States on Dec. 30, 2009 now abandoned, which claims earlier priority benefit to Korean Patent Application No. 10-2009-0086624 filed with the Korean Intellectual Property Office on Sep. 14, 2009, Korean Patent Application No. 10-2009-0061333 filed with the Korean Intellectual Property Office on Jul. 6, 2009, Korean Patent Application No. 10-2009-0086487 filed with the Korean Intellectual Property Office on Sep. 14, 2009, Korean Patent Application No. 10-2009-0086085 filed with the Korean Intellectual Property Office on Sep. 11, 2009, the disclosures of which are incorporated herein by reference.

BACKGROUND

1. Field

The present invention relates to a chip-type electric double layer capacitor and a method of manufacturing the same, and more particularly, to a chip-type electric double layer capacitor which may be reduced in size and weight and a method of manufacturing the same.

2. Description of the Related Art

In various electronic products such as information communication devices, a stable energy supply is considered to be an important element. In general, such a function is performed by a capacitor. That is, the capacitor serves to store electricity in a circuit provided in various electronic products such as information communication devices and then discharge the electricity, thereby stabilizing the flow of electricity with the circuit. A general capacitor has a short charge and discharge time, a long lifespan, and high output density. However, since the general capacitor has low energy density, there is a limitation in using the capacitor as a storage device.

To overcome such a limitation, a new category of capacitors such as electric double layer capacitors have recently been developed, which have a short charge and discharge time and high output density. A great deal of attention is being paid to such capacitors as next generation energy devices together with secondary cells.

The electric double layer capacitor is an energy storage device using a pair of charge layers (electrode layers) having a different polarity. The electric double layer capacitor may perform continuous electrical charge and discharge cycles and has higher energy efficiency and output and greater durability and stability than other, more general capacitors. Accordingly, the electric double layer capacitor which may be charged and discharged with high current is being recognized as a storage device which may be charged and discharged at a high frequency, such as an auxiliary power supply for mobile phones, an auxiliary power supply for electric vehicles, and an auxiliary power supply for solar cells.

A basic structure of the electric double layer capacitor includes an electrode, an electrolyte, a current collector, and a separator. The electrode has a relatively large surface area such as a porous electrode. The operational principle of the electric double layer capacitor is an electro-chemical mechanism in which electricity is generated when a voltage of several volts is applied to both ends of a unit cell electrode such that ions in the electrolyte move along an electric field to be adsorbed by an electrode surface.

In general, to surface mount such an electric double layer capacitor on a circuit board, a bracket is welded over and under the electric double layer capacitor, and the electric double layer capacitor is then mounted on the circuit board through the bracket.

However, the electric double layer capacitor having such a structure has a relatively large thickness. Due to the additional structures required for surface mounting, such as the brackets and so on, the thickness further increases. When such an electric double layer capacitor is used, there may be difficulties in manufacturing high-capacity products because of the increase in thickness. Furthermore, since an additional manufacturing process must be performed, the price of products inevitably increases.

SUMMARY

An aspect of the present invention provides a chip-type electric double layer capacitor which may be reduced in size and weight and surface-mounted without an additional structure and a method of manufacturing the same.

According to an aspect of the present invention, there is provided a chip-type electric double layer capacitor including: an exterior case including a housing space formed therein and formed of insulation resin; a first external terminal buried in the exterior case and including a first surface exposed to the housing space and a second surface exposed to the outside of the exterior case; a second external terminal buried in the exterior case and including a first surface exposed to the housing space and a second surface exposed to the outside of the exterior case; and an electric double layer cell disposed in the housing space so as to be electrically connected to the first surfaces of the first and second external terminals.

The first and second external terminals may be buried in the external case by insert injection molding.

The first and second external terminals may have a buried region extension region.

The insulation resin may be polyphenylene sulfide (PPS) or liquid crystal polymer (LCP).

The chip-type electric double layer capacitor may further include adhesive layers which are formed to cover boundary surfaces between the exterior case and the first and second external terminals, respectively.

The adhesive layers may be formed to cover boundary surfaces between the exterior case and the second surfaces of the first and second external terminals, respectively.

The adhesive layers may be formed to cover boundary surfaces between the exterior case and the first surfaces of the first and second external terminals, respectively.

The adhesive layers may include epoxy resin.

The first and second external terminals may be formed on the same surface of the exterior case.

The first and second external terminals may be formed at both ends of the same surface of the exterior case.

The first and second external terminals may be formed on the same surface of the exterior case so as to be positioned toward the central portion of the surface.

The exterior case may further include sealing portions formed in the respective corners of the housing space.

The exterior case may include a lower case having the housing space of which the top surface is opened and the first and second external terminals buried therein, and an upper cap mounted on the lower case so as to cover the housing space.

The exterior case may include a lower case having the housing space of which the top surface is opened, sealing portions formed in the corner of the respective corners of the housing space, and the first and second external terminals buried therein, and an upper cap mounted on the lower case having the sealing portions so as to cover the housing space.

The lower case and the upper cap may be coupled to each other by welding or ultrasonic welding.

The sealing portions may be formed integrally with the lower case by insert injection molding.

The sealing portions may be formed separately from the lower case by double injection molding.

The sealing portions and the lower case may be formed of the same insulation resin or different insulation resins.

The electric double layer capacitor cell may include first and second current collectors, first and second electrodes connected to the first and second current collectors, respectively, and an ion-permeable separator formed between the first and second electrodes.

The first surfaces of the first and second external terminals and the electric double layer capacitor cell may be connected by welding or ultrasonic welding.

The electric double layer capacitor cell may include one or more pairs of first and second current collectors, one or more pairs of first and second electrodes, and one or more separators which are continuously stacked.

The electric double layer capacitor cell may be formed by winding first and second electrodes.

According to another aspect of the present invention, there is provided a method of manufacturing a chip-type electric double layer capacitor, including: forming a lower case having an opened housing space and first and second external terminals buried therein, the first and second external terminals having first surfaces exposed to the housing space, respectively, and second surfaces exposed to an outer region of the lower case, respectively; mounting an electric double layer capacitor cell in the housing space such that the electric double layer capacitor cell is electrically connected to the first surfaces of the first and second external terminals exposed to the housing space; and mounting an upper cap on the lower case so as to cover the housing space.

The method may further include forming adhesive layers to cover boundary surfaces between the exterior case and the first and second external terminals.

The forming of the lower case may be performed by insert injection molding.

The method may further include forming sealing portions in the respective corners of the housing space.

The sealing portions may be formed integrally with the lower case by insert injection molding.

The sealing portions may be formed separately from the lower case by double injection molding.

The connection between the first and second external terminals and the electric double layer capacitor cell may be performed by welding or ultrasonic welding.

The mounting of the upper cap on the lower case may be performed by welding or ultrasonic welding.

BRIEF DESCRIPTION OF THE DRAWINGS

The above and other aspects, features and other advantages of the present invention will be more clearly understood from the following detailed description taken in conjunction with the accompanying drawings, in which.

DESCRIPTION OF EMBODIMENTS

Figure 1A:
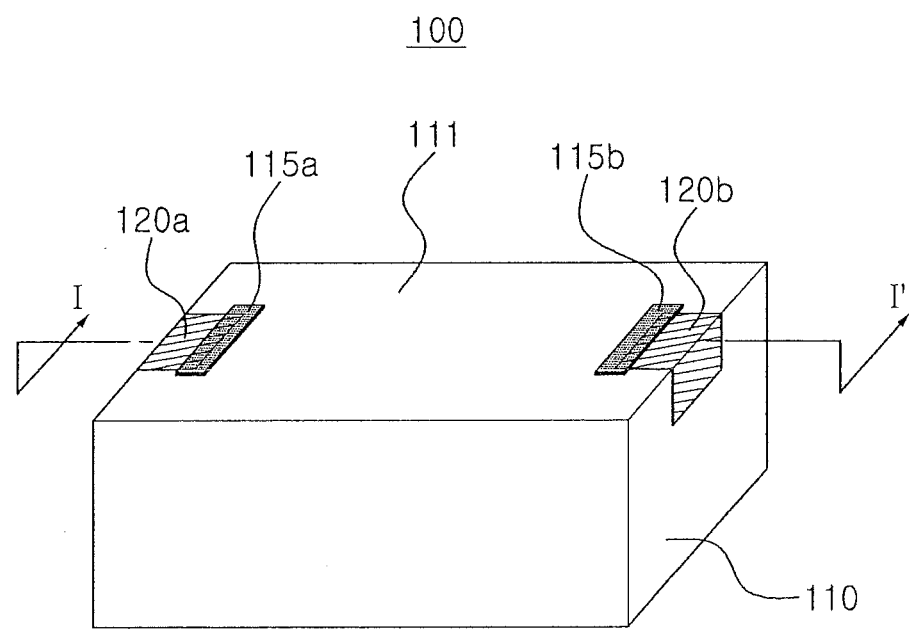
FIG. 1A is a schematic cross-sectional view of a chip-type electric double layer capacitor according to an embodiment of the present invention.

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the thicknesses of layers and regions are exaggerated for clarity. Like reference numerals in the drawings denote like elements, and thus their description will be omitted.

Figure 2A:
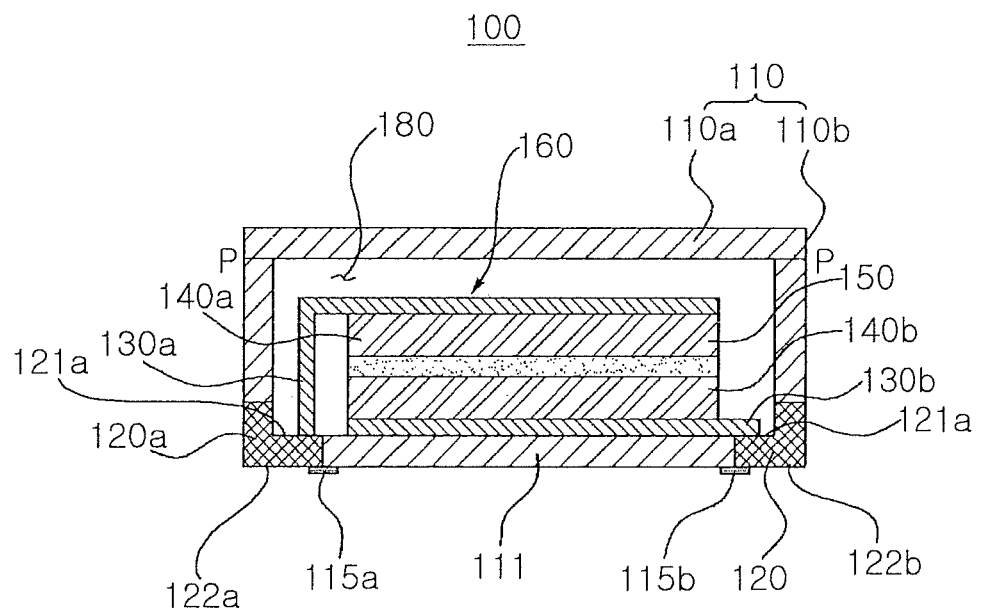
FIG. 2A is a schematic cross-sectional view of the chip-type electric double layer capacitor of FIG. 1A, taken along a line I-I'.

FIG. 1A is a schematic cross-sectional view of a chip-type electric double layer capacitor according to an embodiment of the present invention. FIG. 2A is a schematic cross-sectional view of the chip-type electric double layer capacitor, taken along a line I-I' of FIG. 1A.

Referring to FIGS. 1A and 2A, the chip-type electric double layer capacitor 100 according the embodiment of the present invention includes an exterior case 110 having a housing space 180 formed therein and formed of insulation resin and an electric double layer capacitor cell 160 disposed in the housing space of the exterior case 110.

The exterior case 110 includes first and second external terminals 120a and 120b buried therein. The first external terminal 120a has a first surface 121a exposed to the housing space 180 and a second surface 122a exposed to the outside of the exterior case 110, and the second external terminal 120b has a first surface 121b exposed to the housing space 180 and a second surface 122b exposed to the outside of the exterior case 110. That is, the first and second external terminals 120a and 120b are structures for connecting the outside of the exterior case 110 and the inside of the housing space 180.

The external case 110 may be formed integrally with the first and second external terminals 120a and 120b by insert injection molding. For example, a mold having a desired exterior-case shape may be prepared, the first and second external terminals may be disposed in the mold, and insulation resin may be injected into the mold to manufacture the external case 110 integrated with the first and second external terminals 120a and 120b. At this time, the first and second external terminals may be disposed to have the first surface exposed to the housing space of the external case and the second surface exposed to the outside of the external case.

The electric double layer cell 160 is disposed in the housing space of the exterior case 110, and electrically connected to the first surfaces 121a and 121b of the first and second external terminals 120a and 120b exposed to the housing space 180. The second surfaces 122a and 122b of the first and second external terminals 120a and 120b may be units for electrically connecting the electric double layer cell 160 to an external power supply.

The chip-type electric double layer capacitor 100 according to this embodiment of the present invention may include adhesive layers 115a and 115b which are formed to cover boundary surfaces between the exterior case and the first and second external terminals 120a and 120b, respectively. More specifically, referring to FIGS. 1A and 2A, the adhesive layers 115a and 115b may be formed to cover the boundary surfaces between the exterior case and the second surfaces 122a and 122b of the first and second external terminals, respectively.

Although not shown, adhesive layers may be formed to cover boundary surfaces between the exterior case and the surfaces of the first and second external terminals exposed to the housing space.

Although the external terminals 120a and 120b are integrated with the external case 110, a minute gap may occur due to the heterogeneity between the two materials, and an electrolyte may escape through the minute gap. That is, when the electrolyte escapes while the chip-type electric double layer capacitor is manufactured or used, reliability may decrease, and the lifespan of the chip-type electric double layer capacitor may be reduced.

Therefore, when the adhesive layers 115a and 115b are formed at the boundary surfaces between the exterior case and the first and second external terminals, respectively, it is possible to prevent the electrolyte from escaping.

The adhesive layer may be formed using epoxy resin. The epoxy resin is not specifically limited. For example, multifunctional epoxy resin having two or more epoxy groups in a molecule, such as bisphenol A epoxy resin, bisphenol novolac resin and so on, may be used as the epoxy resin. The epoxy resin may include a cross-liking agent.

Referring to FIGS. 1A and 2A, the first and second external terminals 120a and 120b may be formed on the same surface 111 of the external case 111. Furthermore, although not shown, the first and second external terminals may be formed on different surfaces of the external case, respectively.

When the first and second external terminals are formed on the same surface 111, the chip-type electric double layer capacitor 100 may be surface-mounted (SMT) without an additional structure.

In order to implement such a structure, the first and second external 120a and 120b and the external case 110 may form one plane.

The formation positions of the first and second external terminals are not specifically limited, and the first and second external terminals 120a and 120b may be formed at both ends of the same surface 111 of the external case. The first and second external terminals may extend from both ends of the same surface 111 of the exterior case to both side surfaces connected to the same surface 111, respectively. When the chip-type electric double layer capacitor is surface-mounted, the regions of the first and second external terminals extending to the side surfaces may be utilized for a performance test of the chip-type electric layer double capacitor.

Figure 1B:
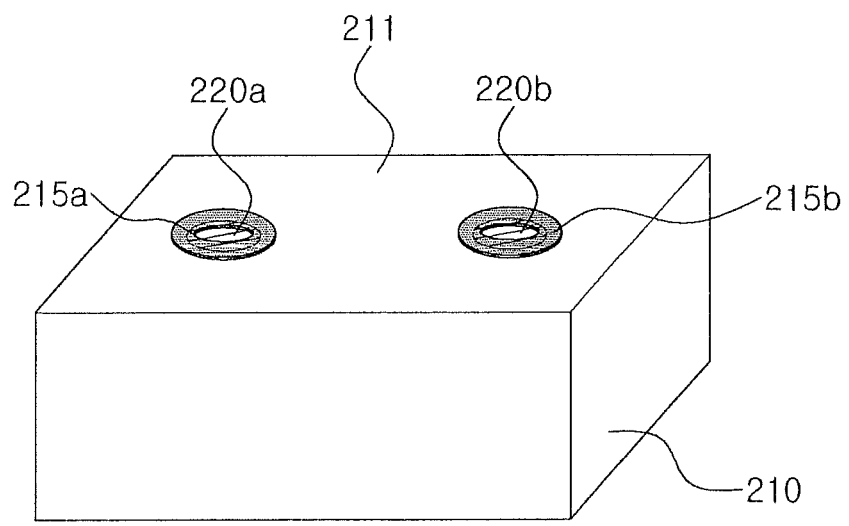
FIG. 1B is a schematic perspective view of a chip-type electric double layer capacitor according to another embodiment of the present invention.

FIG. 1B is a schematic perspective view of a chip-type electric double layer capacitor 200 according to another embodiment of the present invention. Referring to FIG. 1B, the chip-type electric double layer capacitor 200 may include first and second external terminals 220a and 220b which are formed on the same surface 211 of an external case 210 so as to be positioned toward the central portion of the same surface 211.

The chip-type electric double layer capacitor 200 may include adhesive layers 215a and 215b which are formed to cover boundary surfaces between the exterior case 210 and the first and second external terminals 220a and 220b, respectively.

Referring to FIG. 2A, the electric double layer cell 160 disposed in the housing space 180 of the exterior case 110 is electrically connected to the first surfaces 121a and 121b of the first and second external terminals 120a and 120b exposed to the housing space. The electric double layer capacitor cell 160 may be connected to the first surfaces 121 a and 121 b of the first and second external terminals 120a and 120b exposed to the housing space 180 by welding or ultrasonic welding.

The electric double layer capacitor cell may include first and second current collectors 130a and 130b, first and second electrodes 140a and 140b connected to the first and second current collectors 130a and 130b, respectively, and an ion permeable separator 150 formed between the first and second electrodes 140a and 140b.

The first and second current collectors 130a and 130b are conductive sheets for transferring an electrical signal to the first and second electrodes 140a and 140b, respectively, and may be formed of a conductive polymer, a rubber sheet, or a metallic foil. In this embodiment, the electric double layer capacitor cell 160 may be electrically connected to the first and second external terminals 120a and 120b through the current collectors 130a and 130b. The shapes of the first and second current collectors 130a and 130b may be properly modified in such a manner that they are electrically connected to the first and second external electrodes 120a and 120b, respectively. Such a modification may be influenced by the shape or size of the electric double layer capacitor cell.

Referring to FIG. 2A, the first current collector 130a may have a bent portion for the connection with the first external terminal 120a, and the first and second current collectors 130a and 130b may be directly connected to the first and second external terminals 120a and 120b, respectively.

Although not shown, the first and second current collectors may be electrically connected to the first and second external terminals through proper connection members, respectively.

Furthermore, although not shown, an insulation layer may be formed between one surface of the exterior case, in which the first and second external terminals 120a and 120b are buried, and the second current collector 130 contacted with the surface, in order to prevent a short circuit.

When the electric double layer capacitor cell does not include the first and second current collectors 130a and 130b, the first and second electrodes 130a and 130b may be electrically connected to the first surfaces of the first and second external terminals 120a and 120b exposed to the housing space.

The first and second electrodes 140a and 140b may be formed of a polarizable electrode material. For example, activated carbon with a relatively high specific surface area may be used. The first and second electrodes 140a and 140b may be manufactured by making an electrode material mainly consisting of powdered activated carbon into a solid-state sheet or adhering electrode material slurry onto the first and second current collectors 130a and 130b.

The separator 150 may be formed of a porous material through which ions can permeate. For example, a porous material such as polypropylene, polyethylene, or glass fiber may be used.

In this embodiment, the exterior case 110 may include a lower case 110a and an upper cap 110b. The lower case 110a has a housing space of which the top surface is opened and includes the first and second external terminals 120a and 120b buried therein. The upper cap 110b is mounted on the lower case 110a so as to cover the housing space.

The upper cap 110a and the lower case 110b may be coupled to each other by welding or ultrasonic welding. A symbol P of FIG. 2A indicates a coupling region between the lower case and the upper cap.

The exterior case 110 is formed of insulation resin. Examples of the insulation resin may include polyphenylene sulfide (PPS) and liquid crystal polymer (LCP). Accordingly, the chip-type electric double layer capacitor 100 may protect the internal structure during the surface mounting (SMT) process which is performed at a high temperature of about 240-270° C.

As described above, the chip-type electric double layer capacitor according to this embodiment of the present invention has such a structure that the first and second external terminals 120a and 120b are buried in the exterior case 110. Therefore, its space utilization efficiency increases. Accordingly, it is possible to increase the stacking degree of the electric double layer capacitor cell mounted in the chip-type electric double layer capacitor.

Figure 2B:
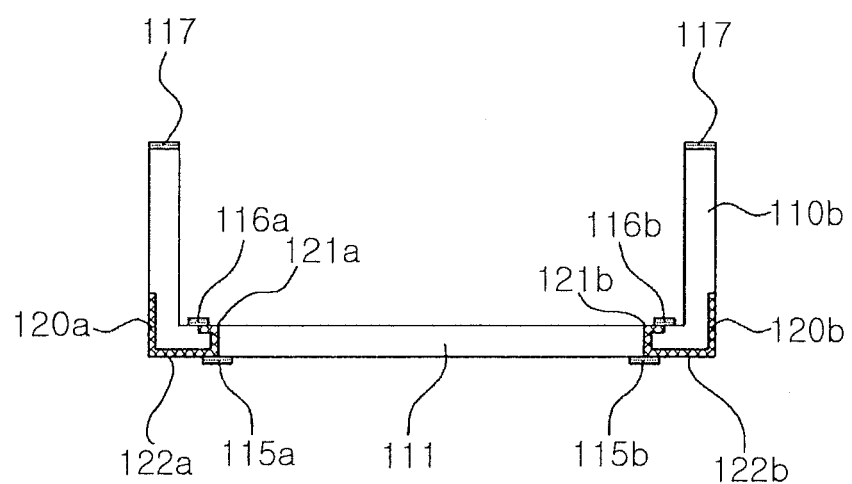
FIG. 2B is a schematic cross-sectional view of a chip-type double layer capacitor according to another embodiment of the present invention, illustrating only a lower case.

FIG. 2B is a schematic cross-sectional view of a chip-type double layer capacitor according to another embodiment of the present invention, illustrating only a lower case 110b. The following descriptions will be focused on different components from those of the above-described embodiment, and the duplicated descriptions of the same components will be omitted.

In this embodiment of the present invention, the first and second external terminals 120a and 120b are buried in the exterior case 110. The first external terminal 120a has the first surface 121a exposed to the housing space 180 and the second surface 122a exposed to the outside of the exterior case. The second external terminal 120a has the first surface 121b exposed to the housing space 180, and the second surface 122b exposed to the outside of the exterior case.

The first and second external terminals 120a and 120b are formed integrally with the external case 110 so as to be buried in the external case 110. However, a minute gap may occur due to due to the heterogeneity between the two materials, and an electrolyte may escape through the minute gap.

When the electrolyte escapes while the chip-type electric double layer capacitor is manufactured or used, its reliability may decrease, and its lifespan may be reduced.

Therefore, the contact area between the first and second external terminals and the exterior case may be widened in such a manner that an electrolyte escape path can be extended.

Accordingly, the first and second external terminals may be formed to have a buried region extension portion D. The shape of the buried region extension portion D is not limited. Referring to FIG. 2B, the first and second external terminals are formed in a plate shape. In this case, the plate shape may be bent in such a manner that a part thereof is exposed to the housing space and another part thereof is exposed to the outside. Accordingly, the buried regions of the first and second external terminals in the exterior case may be extended.

The chip-type double layer capacitor according to this embodiment of the present invention may include adhesive layers which are formed to cover the boundary surface between each of the first and second external terminals and the exterior case. Referring to FIG. 2, the chip-type double layer capacitor may include first adhesive layers 115a and 115b which are formed to cover the boundary surfaces between the external case and the second surfaces 122a and 122b of the first and second external terminals 120a and 120b, respectively, and second adhesive layers 116a and 116b which are formed to cover the boundary surfaces between the external case and the first surfaces 121a and 121b of the first and second external terminals 120a and 120b, respectively.

Furthermore, the chip-type double layer capacitor may include a third adhesive layer 117 formed on a coupling region of the lower case 110b which is to be coupled to the upper cap 110a.

Figure 2C:
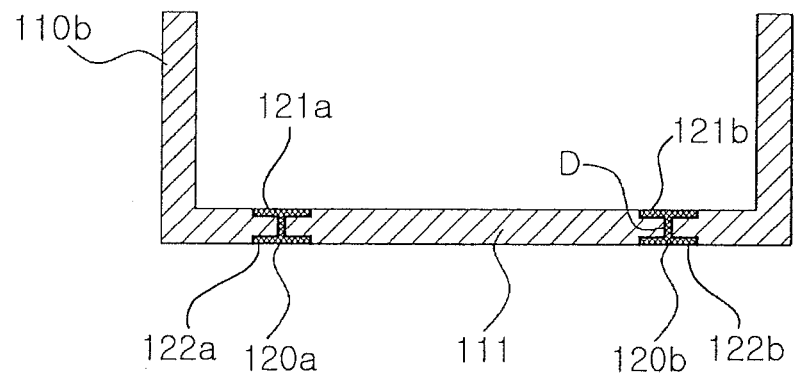
FIG. 2C is a schematic cross-sectional view of a chip-type double layer capacitor according to another embodiment of the present invention, illustrating only a lower case.

FIG. 2C is a schematic cross-sectional view of a chip-type double layer capacitor according to another embodiment of the present invention, illustrating only a lower case 110b. The following descriptions will be focused on different components from those of the above-described embodiments, and the duplicated descriptions of the same components will be omitted.

Referring to FIG. 2C, the first external terminal has the first surface 121 a exposed to the housing space 180 and the second surface 122a exposed to the outside, and the second external terminal has the first surface 122a exposed to the housing space 180 and the second surface 122b exposed to the outside. The first and second external terminals have a buried region extension portion D. The buried region extension portion D may be formed in various shapes such that a contact area with exterior case can be extended.

Figure 3A:
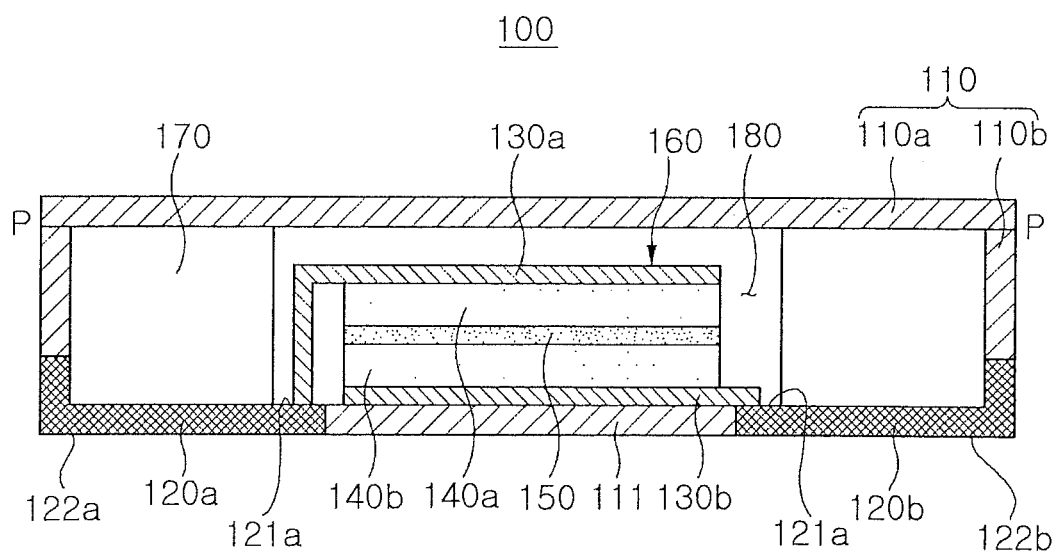
FIG. 3A is a schematic cross-sectional view of a chip-type electric double layer capacitor according to another embodiment of the present invention.
Figure 3B:
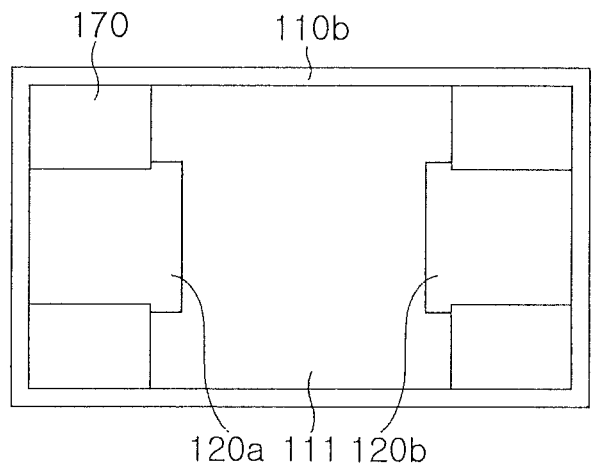
FIG. 3B is a plan view of a lower case of the chip-type electric double layer capacitor according to the embodiment of the present invention.

FIG. 3A is a schematic cross-sectional view of a chip-type electric double layer capacitor 100 according to another embodiment of the present invention. FIG. 3B is a plan view of a lower case 110b of the chip-type electric double layer capacitor according to the embodiment of the present invention. The following descriptions will be focused on different components from those of the above-described embodiments, and the duplicated descriptions of the same components will be omitted.

Referring to FIGS. 3A and 3B, the chip-type electric double layer capacitor 100 according to this embodiment of the present invention includes an exterior case 110 and an electric double layer capacitor cell 160. The exterior case 110 has a housing space 180 formed therein, includes sealing portions 170 formed in the respective corners of the housing space 180, and is formed of insulation resin. The electrode double layer cell 160 is disposed in the housing space 180 of the exterior case 110.

The sealing portions 170 may be formed by injecting insulation resin such that the lower case 110b having the first and second external terminals 120a and 120b buried therein are molded integrally with the sealing portions 170 by insert injection molding or the like. In this case, the sealing portions 170 may be formed of the same insulation resin as the lower case 110b.

Instead of the above-described structure in which the sealing portions 170 and the lower case 110b are integrally molded, the sealing portions 170 maybe formed in the respective corners of the housing space 180 inside the lower case 110b by double injection molding, separately from the lower case 110b. In this case, the sealing portions 170 may be formed of the same insulation resin as the lower case 110b, but formed of a different insulation resin from the lower case 110b.

The lower case 110b including the sealing portions 170 may be coupled to the upper cap 110a by welding or ultrasonic welding. A symbol P of FIG. 3A indicates a coupling region between the upper cap 110a and the lower case 110b including the sealing portions 170.

According to this embodiment of the present invention, as the sealing portions 170 are formed in the respective corners of the housing space 180 inside the lower case 110b, it is possible to maximize the welded surface of the lower case 110b coupled to the upper cap 110a. Therefore, a probability in which the electrolyte inside the chip-type electric double layer capacitor 100 may escape to the outside may be minimized to strengthen the sealing property.

Furthermore, as the sealing portions 170 are formed in the above-described manner, the coupling region P between the lower case 110b and the upper cap 110a, that is, the welded area therebetween may be widened. Then, a coupling force between the lower case 110b and the upper cap 110a may be maximized to increase the durability of a finalized product.

Figure 4:
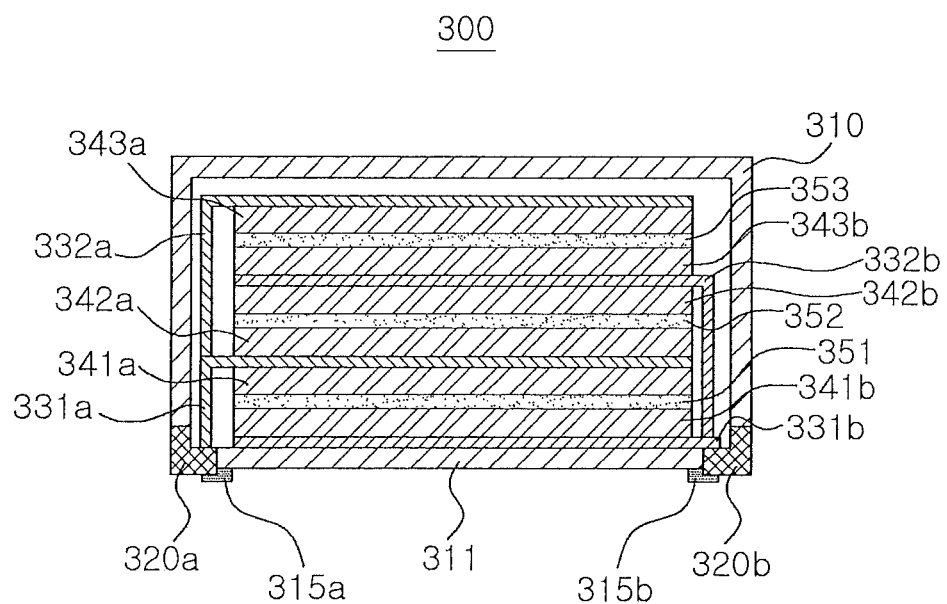
FIG. 4 is a schematic cross-sectional view of a chip-type electric double layer capacitor according to another embodiment of the present invention.

FIG. 4 is a schematic cross-sectional view of a chip-type electric double layer capacitor 300 according to another embodiment of the present invention. The following descriptions will be focused on different components from those of the above-described embodiments, and the duplicated descriptions of the same components will be omitted.

Referring to FIG. 4, the electric double layer capacitor according to this embodiment of the present invention has a structure in which one or more pairs of first and second current collectors, one or more pairs of first and second electrodes, and one or more separators are continuously stacked. Since the electric double layer capacitor has high space utilization efficiency, it may include a plurality of electric double layer cells stacked therein.

More specifically, primary first and second current collectors 331a and 331b are connected to first and second external terminals 320a and 320b, respectively. The primary first current collector 331a is connected to a primary first electrode 341a, the primary second current collector 331b is connected to a primary second electrode 341b, and a primary ion-permeable separator 351 is formed between the primary first and second electrodes 341a and 341b, thereby forming one unit cell.

The primary first current collector 331a is connected to a secondary first electrode 342a, a secondary second current collector 332b is connected to a secondary second electrode 342b, and a secondary ion-permeable separator 352 is formed between the secondary first and second electrodes 342a and 342b, thereby forming another unit cell. The secondary second current collector 332b is bent to be electrically connected to the second external terminal 320b.

The secondary second current collector 332b is connected to a tertiary second electrode 343b, a secondary first current collector 332a is connected to a tertiary first electrode 343a, and a tertiary ion-permeable separator 353 is formed between the tertiary first and second electrodes 343a and 343b, thereby forming another unit cell. The secondary first current collector 332a is bent to be electrically connected to the second external terminal 320b.

As in this embodiment, the plurality of unit cells may be stacked to obtain a high capacitance. Although not shown, an insulation material may be applied onto the outside of the unit-cell multilayer structure to prevent an unexpected short circuit.

In this embodiment of the present invention, the first and second external terminals 320a and 320b are buried into one surface 311 of the exterior case. However, since the first and second external terminals 320a and 320b have a larger thickness than the exterior case, they protrude to the outside of the exterior case.

Furthermore, the electric double layer capacitor according to the embodiment of the present invention may include adhesive layers 315a and 315b which are formed to cover boundary surfaces between the exterior case and the first and second external terminals, respectively.

Figure 5A:
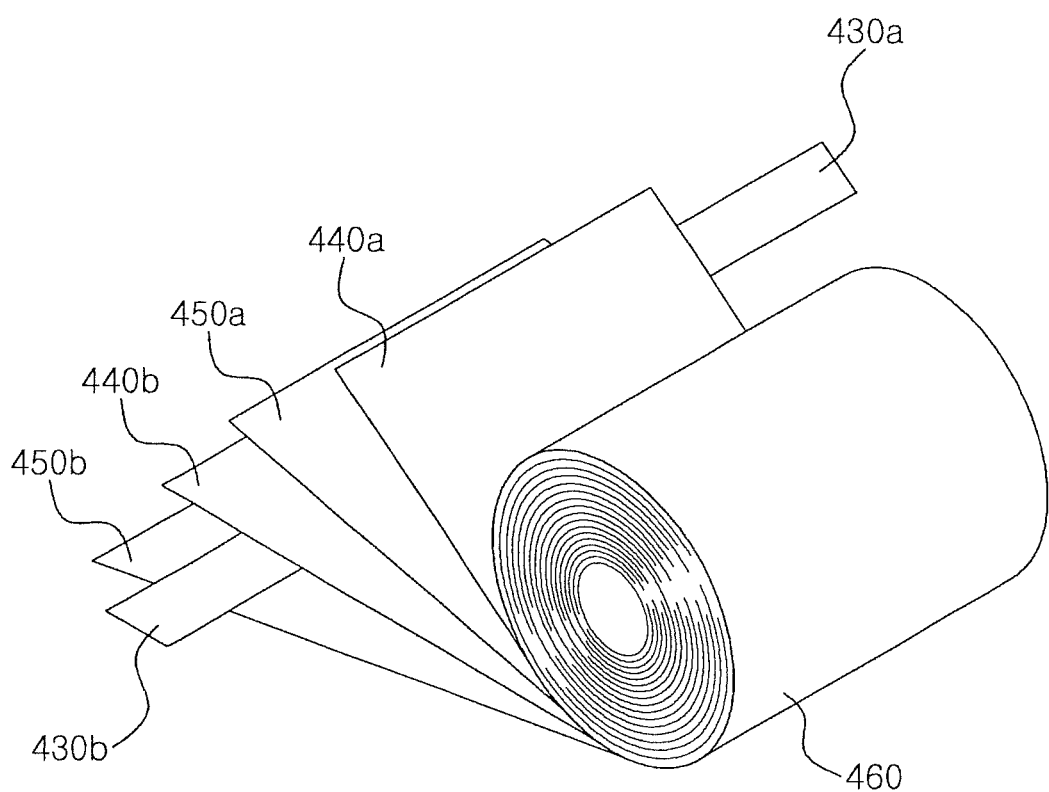
FIG. 5A is a schematic perspective view of a chip-type electric double layer capacitor cell according to another embodiment of the present invention.
Figure 5B:
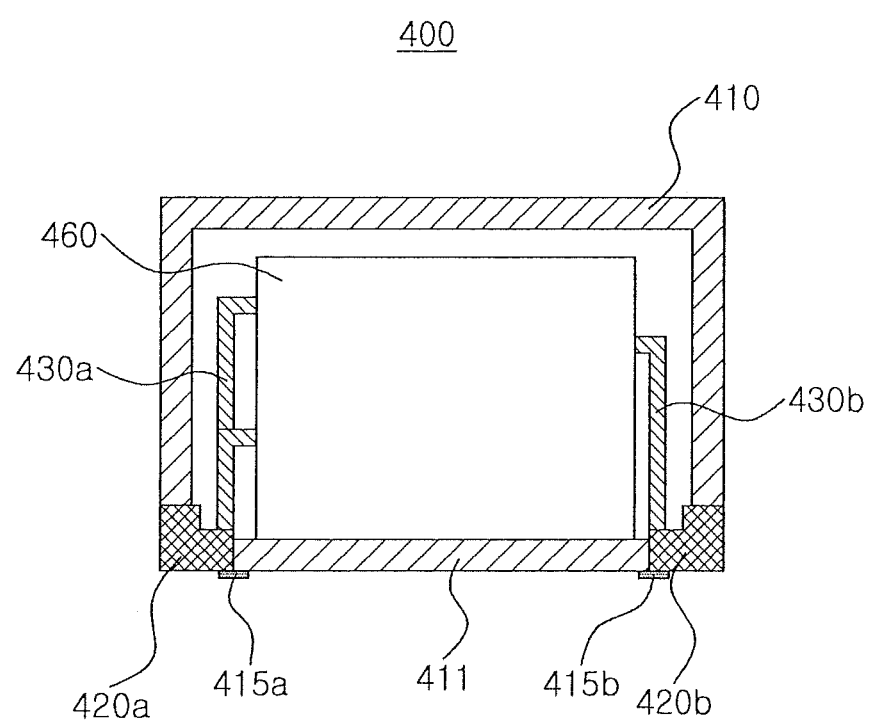
FIG. 5B is a schematic cross-sectional view of a chip-type electric double layer capacitor according to the embodiment of the present invention.

FIG. 5A is a schematic perspective view of a chip-type electric double layer capacitor cell 460 according to another embodiment of the present invention, and FIG. 5B is a schematic cross-sectional view of a chip-type electric double layer capacitor 400 according to the embodiment of the present invention. The following descriptions will be focused on different components from those of the above-described embodiments, and the duplicated descriptions of the same components will be omitted.

Referring to FIGS. 5A and 5B, the electric double layer cell 460 according to this embodiment of the present invention has a structure in which first and second electrodes are wound. More specifically, a first electrode 440a, a first separator 450a, a second electrode 440b, and a second separator 450b are sequentially stacked, and the multilayer structure is wound to form the electric double layer cell 460. The first and second electrodes 440a and 440b are connected to first and second current collectors 430a and 430b, respectively.

The electric double layer capacitor cell 460 is disposed in a housing space of an exterior case 410, and the first and second current collectors 430a and 430b are bent to be electrically connected to first and second external terminals 420a and 420b, respectively.

In this embodiment, the first and second external terminals 420a and 420b are buried into one surface 411 of the exterior case. However, the first and second external terminals 420a and 420b have a larger thickness than the exterior case so as to protrude to the housing space of the exterior case.

Furthermore, the electric double layer capacitor according to the embodiment of the present invention may include adhesive layers 415a and 415b which are formed to cover boundary surfaces between the exterior case and the first and second external terminals, respectively.

Figure 6A:
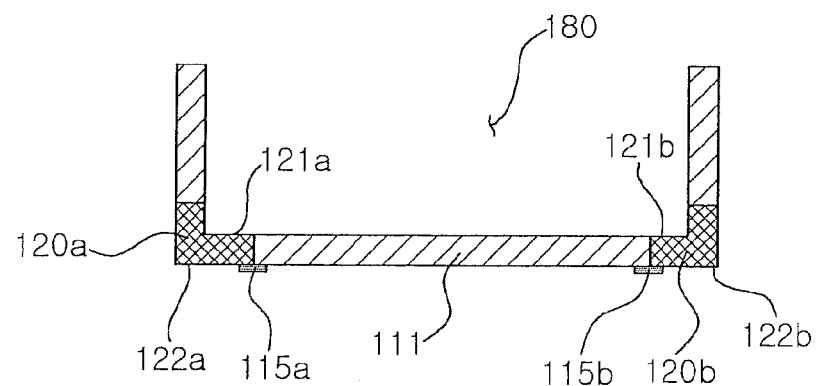
FIGS. 6A to 6C are cross-sectional views explaining a method of manufacturing a chip-type electric double layer chip capacitor according to another embodiment of the present invention.
Figure 6B:
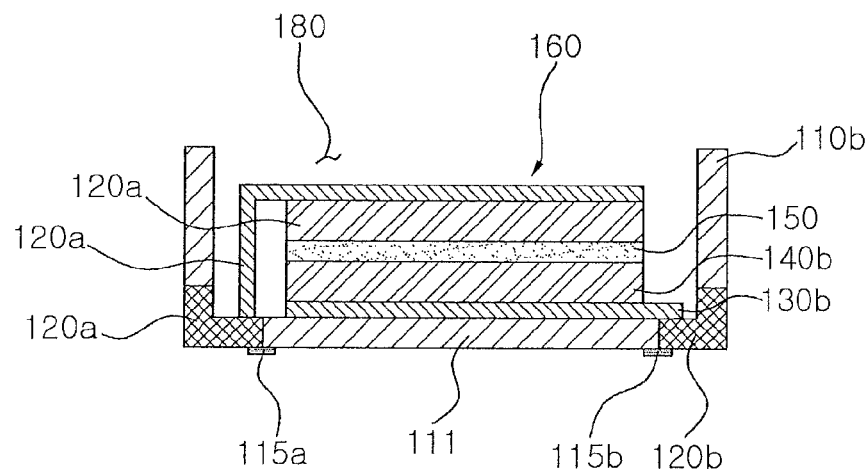
Figure 6C:
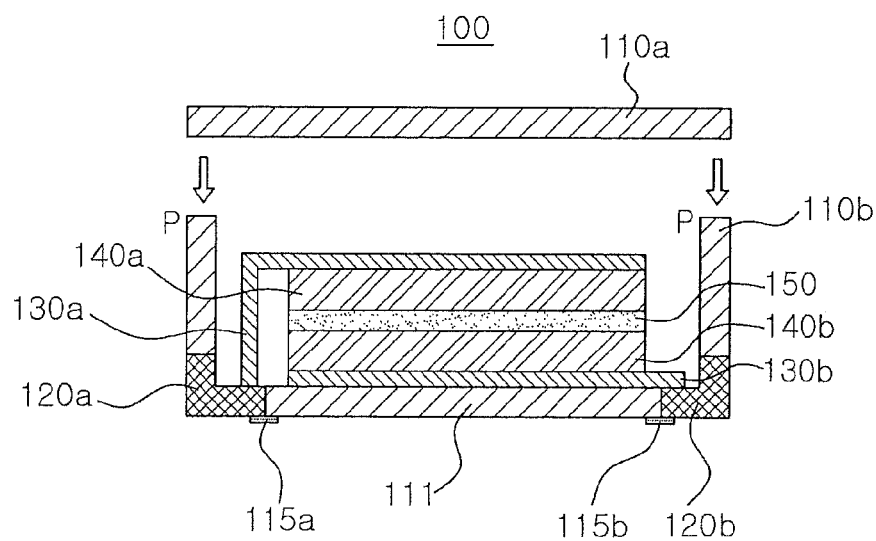

FIGS. 6A to 6C are cross-sectional views explaining a method of manufacturing a chip-type electric double layer chip capacitor according to another embodiment of the present invention.

Referring to FIG. 6A, a lower case 110b having an opened housing space 180 and including first and second external terminals 120a and 120b buried therein is formed. The first external terminal 120a has a first surface 121a exposed to the housing space 180 and a second surface 122a exposed to the outside of the lower case 110b, and the second external terminal 120b has a first surface 122a exposed to the housing space 160 and a second surface 122b exposed to the outside of the lower case 110b.

The process of forming the lower case 110b is not specifically limited, as long as insulation resin and the first and second external terminals may be integrally molded so that the first and second external terminals are buried in the insulation resin. For example, insert injection molding may be applied.

More specifically, the first and second external terminals are disposed in a mold having a desired lower-case shape, and insulation resin is injected into the mold. The insulation resin injected into the mold hardens with the first and second external terminals in the mold through cooling or cross-linking. The insulation resin and the first and second external terminals are integrated by the insert injection molding, even though the first and second external terminals are formed of a different material from the insulation resin.

Next, adhesive layers are formed to cover boundary surfaces between the external case and the first and second external terminals, respectively. Referring to FIG. 6A, the adhesive layers 115a and 115b may be formed to cover the boundary surfaces between the exterior case and the second surfaces 122a and 122b of the first and second external terminals, respectively. Although not shown, the adhesive layers may be formed to cover the boundary surfaces between the exterior case and the first surfaces 121a and 122b of the first and second external terminals.

Referring to FIG. 6B, an electric double layer capacitor cell 160 is mounted in the housing space so as to be electrically connected to the first surfaces 121a and 121b of the first and second external terminals 120a and 120b exposed to the housing space of the lower case 110b.

As described above, the electric double layer capacitor cell may include first and second current collectors 130a and 130b, first and second electrodes 140a and 140b connected to the first and second current collectors 130a and 130b, respectively, and an ion-permeable separator 150 formed between the first and second electrodes 140a and 140b. The first and second current collectors 130a and 130b are electrically connected to the first surfaces of the first and second external terminals 120a and 120b exposed to the housing space, and the first current collector 130a may have a bent shape.

The first and second external terminals 120a and 120b may be connected to the first and second current collectors 130a and 130b, respectively, by welding or ultrasonic welding. For example, resistance welding or arc welding may be applied.

Referring to FIG. 6C, an upper cap 110a is mounted on the lower case 110b so as to cover the housing space. Then, the lower case 110b having the electric double layer capacitor cell mounted therein is filled with an electrolyte. In this case, an aqueous electrolyte or non-aqueous electrolyte may be used as the electrolyte.

The mounting of the upper cap 110a on the lower case 110b may be performed by forming an adhesive layer (not shown). That is, an adhesive layer is applied on a region P of the lower case 110b, and the upper cap 110a is mounted on the region P so as to be coupled to the lower case 110b.

Alternatively, the mounting of the upper cap 110a on the lower case 110b may be performed by welding or ultrasonic welding. For example, resistance welding or arc welding may be applied.

Through such a process, the airtightness between the lower case and the upper cap may be improved to protect the internal elements of the exterior case.

Figure 7A:
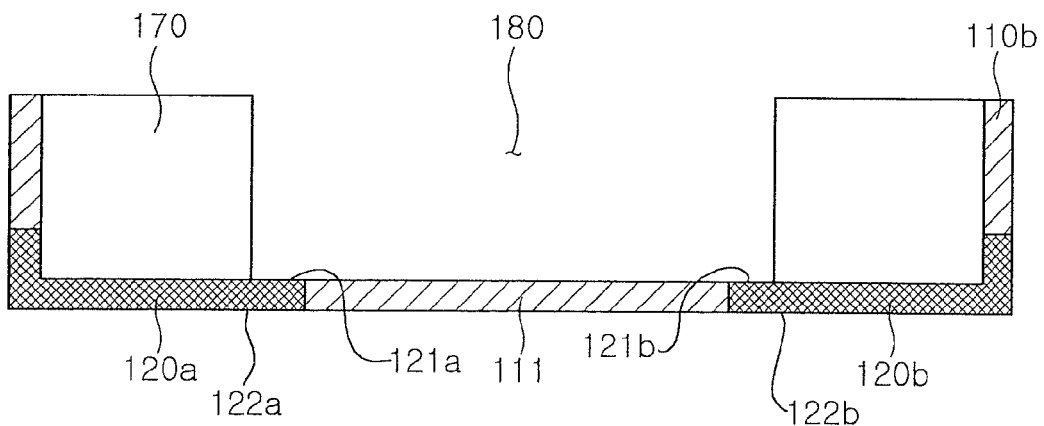
FIGS. 7A to 7C are cross-sectional views explaining a method of manufacturing a chip-type electric double layer capacitor according to another embodiment of the present invention.
Figure 7B:
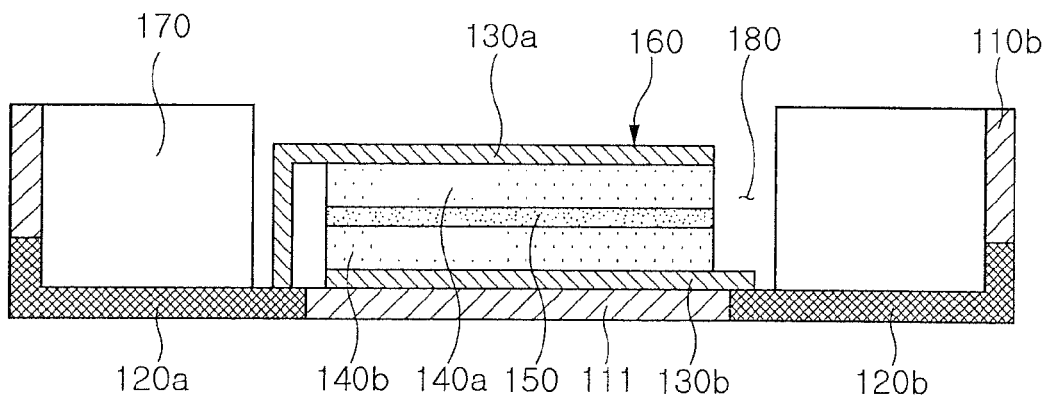
Figure 7C:
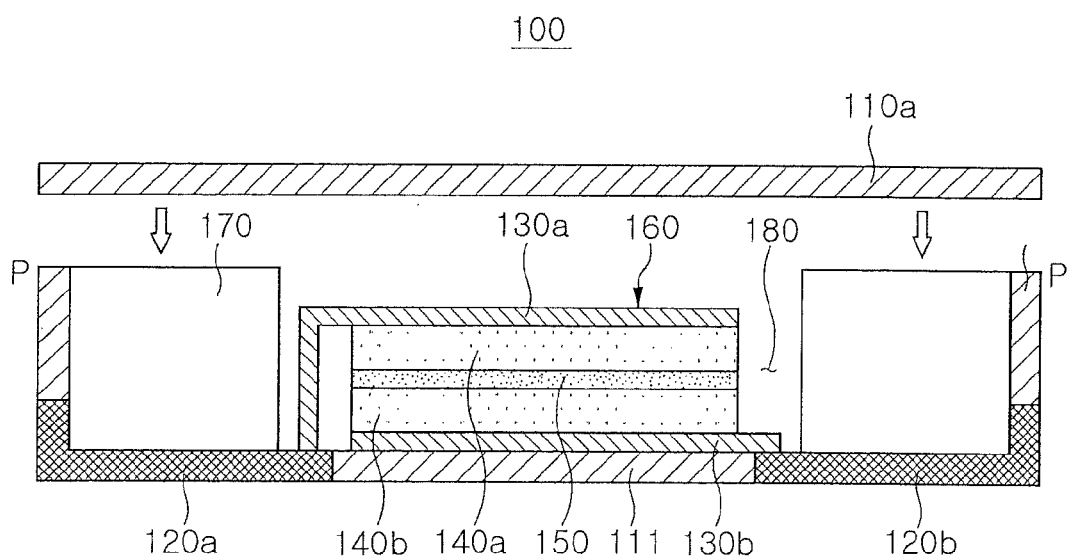

FIGS. 7A to 7C are cross-sectional views explaining a method of manufacturing a chip-type electric double layer capacitor according to another embodiment of the present invention. The following descriptions will be focused on different components from those of the above-described embodiment, and the duplicated descriptions of the same components will be omitted.

Referring to FIG. 7A, a lower case 110b is formed. The lower case 110b includes first and second external terminals 120a and 120b buried therein, a housing space 180 of which the top surface is opened, and sealing portions 170 formed in the respective corners of the housing space 180.

The process of forming the first and second external terminals 120a and 120b and the lower case 110b is not limited, as long as insulation resin and the first and second external terminals 120a and 120b may be integrally molded so that the first and second external terminals 120a and 120b are buried in the insulation resin. For example, insert injection molding may be used.

At this time, the sealing portions 170 formed in the respective corners of the housing space 180 of the lower case 110b may be formed integrally with the lower case 10b during the insert injection molding of the lower case 110b.

Alternatively, the sealing portions 170 and the lower case 110b may be separately formed by double injection molding, unlike the above-described process. In this case, the sealing portions 170 and the lower case 110b may be formed of the same insulation resin or different insulation resins.

Referring to FIG. 7B, an electric double layer capacitor cell 160 is mounted in the housing space 180 so as to be electrically connected to the first surfaces 121a and 121b of the first and second external terminals 120a and 120b exposed to the housing space 180 of the lower case 110b.

After the electric double layer capacitor cell 160 is mounted in the lower case 110b, the housing space 180 is filled with an electrolyte. In this case, an aqueous electrolyte or non-aqueous electrolyte may be used as the electrolyte.

Referring to FIG. 7C, an upper cap 110a is mounted on the lower case 110b including the sealing portions 170 so as to cover the housing space 180.

The mounting of the upper cap 110a on the lower case 110b including the sealing portions 170 may be performed by welding or ultrasonic welding. For example, resistance welding or arc welding may be applied. Through such a process, the airtightness between the lower case 110b and the upper cap 110a may be improved to protect the internal elements of the exterior case 110.

According to this embodiment of the present invention, as the sealing portions 170 are formed in the lower case 110b, it is possible to maximize the coupling area between the upper cap 110a and the lower case 110b. Therefore, since the electrolyte inside the lower case 110b may be prevented from escaping to the outside, the sealing property may be improved to increase the durability of a finalized product.

In the chip-type electric capacitor type according to the embodiment of the present invention, since the exterior case and the external terminals are integrally formed, the space utilization efficiency is high. Accordingly, the electric double layer capacitor may be reduced in size and weight and increased in capacity. Furthermore, the chip-type electric double layer capacitor may be surface-mounted without an additional structure. A collective mounting technique using a solder method may be applied to simplify the surface mounting process.

Furthermore, since the contact area between the first and second external terminals and the exterior case may be extended, the electrolyte escape path may be enlarged. Further, the adhesive layers may be formed at the boundary surfaces between the first and second external terminals and the exterior case. Accordingly, it is possible to prevent the electrolyte form escaping.

Furthermore, as the sealing portions are formed in the respective corners of the housing space when the lower is molded, the welded surface of the lower case coupled to the upper cap may be maximized. Therefore, since the electrolyte inside the exterior case may be prevented from escaping to the outside, it is possible to strength the sealing property. Accordingly, it is possible to improve the durability of a finalized product.

While the present invention has been shown and described in connection with the exemplary embodiments, it will be apparent to those skilled in the art that modifications and variations can be made without departing from the spirit and scope of the invention as defined by the appended claims.

What is claimed is:

1. A method of manufacturing a chip-type electric double layer capacitor, comprising:
forming a lower case having an opened housing space and first and second external terminals buried therein, the first and second external terminals having first surfaces exposed to the housing space, respectively, and second surfaces exposed to an outer region of the lower case, respectively;
forming sealing portions in the respective corners of the housing space;
mounting an electric double layer capacitor cell in the housing space such that the electric double layer capacitor cell is electrically connected to the first surfaces of the first and second external terminals exposed to the housing space; and
mounting an upper cap on the lower case so as to cover the housing space.

2. The method of claim 1, further comprising forming adhesive layers to cover boundary surfaces between the exterior case and the first and second external terminals.

3. The method of claim 1, wherein the forming of the lower case is performed by insert injection molding.

4. The method of claim 1, wherein the sealing portions are formed integrally with the lower case by insert injection molding.

5. The method of claim 1, wherein the sealing portions are formed separately from the lower case by double injection molding.

6. The method of claim 1, wherein the connection between the first and second external terminals and the electric double layer capacitor cell is performed by welding or ultrasonic welding.

7. The method of claim 1, wherein the mounting of the upper cap on the lower case is performed by welding or ultrasonic welding.

* * * * *